US008224870B1

(12) United States Patent
Dingle

(10) Patent No.: US 8,224,870 B1
(45) Date of Patent: *Jul. 17, 2012

(54) DATA STRUCTURE FOR INCREMENTAL SEARCH

(75) Inventor: Adam Dingle, San Francisco, CA (US)

(73) Assignee: Google Inc., Mountain View, CA (US)

( * ) Notice: Subject to any disclaimer, the term of this patent is extended or adjusted under 35 U.S.C. 154(b) by 525 days.

This patent is subject to a terminal disclaimer.

(21) Appl. No.: 12/360,017

(22) Filed: Jan. 26, 2009

Related U.S. Application Data

(63) Continuation of application No. 11/207,583, filed on Aug. 19, 2005, now Pat. No. 7,512,620.

(51) Int. Cl.
*G06F 12/00* (2006.01)
*G06F 17/30* (2006.01)

(52) U.S. Cl. ........................... 707/803; 707/955

(58) Field of Classification Search .......... 707/600–831, 707/955, 960; 711/114
See application file for complete search history.

(56) References Cited

U.S. PATENT DOCUMENTS

| 6,618,727 | B1 | 9/2003 | Wheeler et al. |
| 6,622,140 | B1 | 9/2003 | Kantrowitz |
| 7,296,011 | B2* | 11/2007 | Chaudhuri et al. ................. 1/1 |
| 7,567,976 | B1* | 7/2009 | Betz et al. ............................ 1/1 |
| 7,769,579 | B2* | 8/2010 | Zhao et al. ........................ 704/7 |

OTHER PUBLICATIONS

Junghoo Cho et al., A fast regular expression indexing engine, 2002, IEEE, 419-430.*
David R. Clark et al., Efficient suffix trees on secondary storage, 1996, ACM, 383-391.
Chen et al., Query Optimization in compressed database systems, Jun. 2001, ACM, 271-282.
Hore et al. Indexing text data under space constraints, Nov. 2004, ACM, 198-207.
Liao et al., Proxy prefetch and prefix caching, Sep. 3-7, 2001, IEEE, 95-102.

* cited by examiner

*Primary Examiner* — Jean B Fleurantin
(74) *Attorney, Agent, or Firm* — Fish & Richardson P.C.

(57) ABSTRACT

A system for searching an object environment includes harvesting and indexing applications to create a search database and one or more indexes into the database. A scoring application determines the relevance of the objects, and a querying application locates objects in the database according to a search term. One or more of the indexes may be implemented by a hash table or other suitable data structure, where algorithms provide for adding objects to the indexes and searching for objects in the indexes. A ranking scheme sorts searchable items according to an estimate of the frequency that the items will be used in the future. Multiple indexes enable a combined prefix title and full-text content search of the database, accessible from a single search interface.

23 Claims, 5 Drawing Sheets

DATA STRUCTURE FOR INCREMENTAL SEARCH

This application is a continuation, and claims priority under 35 U.S.C. §120 to U.S. patent application Ser. No. 11/207,583, filed Aug. 19, 2005, which is incorporated herein by reference.

This application is related to co-pending U.S. application Ser. No. 11/207,585 entitled "Temporal Ranking Scheme for Desktop Searching," to Susannah Raub, et al., filed Aug. 19, 2005, and to co-pending U.S. application Ser. No. 11/207,581 entitled "Combined Title Prefix and Full-Word Content Searching," to Daisy Stanton, et al., filed Aug. 19, 2005, each of which is incorporated by reference in its entirely.

BACKGROUND

This invention relates generally to search, and in particular to data structures used for indexing items and matching search queries for incremental searching in a desktop environment.

The typical desktop environment contains a wide variety of information and information sources. A user must select among different interfaces to locate, then access each type of information, for instance by launching a browser to obtain networked information, selecting an application to launch through a start menu, or drilling down among folders for a document or other type of file. There is no single interface for accessing all of these different types of content, placing the burden on the user to search separately for them or to remember specific desktop pathways.

A unified desktop search application could be used to address these problems. Among other possibilities, it would be desirable for a user to be able to access applications, desktop files, and/or data on local or networked servers through a single interface. Access to each of these could be initiated by finding and identifying the correct resource, through the user's selection of a search result. Search results should be generated using methods that reflect how desktop resources are used. In most cases, the most relevant items are likely to be those that have been accessed or used recently and frequently, or have been designated as particularly important by the user, for instance through the creation of a desktop shortcut.

One way to generate a search result based on desktop data is to index the data according to a relevance score, locate data in the index that matches the search string, and provide the result in relative score order. Each step in the process, from generating and updating the index to returning a scored result, consumes read-write cycles, computer memory, and processing resources in amounts that vary depending on system implementation. As a process likely to be run repeatedly throughout the course of a computing session, querying must both be accurate and fast, consuming the minimal amount of resources needed to generate correct results. At the same time, it should be possible to update the data index in real time, as changes in desktop contents occur, with little impact on system performance. It would also be particularly desirable to display incremental search results as a user enters a search string (i.e. carry out prefix searching), in order to save the trouble of entering an entire query. The need for querying efficiency is particularly great in the context of incremental searching since query results are generated not only once, but with each additional character of a search term. For content searching, which is commonly performed in desktop environments, it would be useful to also be able to perform full-text searches that tend to generate more comprehensive results.

What are needed, therefore, are methods of scoring, indexing, and querying items that consume a minimal amount of system resources, generate accurate query results, and support incremental searching.

SUMMARY

An embodiment of the present invention provides a novel way to store and access scored data objects. At the core is a data index designed in such a way that updates can be accomplished with a small number of disk reads and writes, operations that have a large impact on system performance. Updating the index is necessary when new data objects are introduced or the status of an existing object changes—for instance its score changes or it is deleted. Generating query results from the data also requires very little overhead, making the system well-suited to an incremental query system.

Given a set of objects, each of which has a name (e.g., a string) and a score (e.g., a number), an index stores references to the objects so that for any prefix P the top-scored results whose names begin with P can be very quickly retrieved. The index can easily be updated with the addition of new objects discovered during crawling and the adjustment of an object score.

In an embodiment, an object on a computer desktop can be indexed by a process that comprises associating a name with the object, assigning a score to the object according to a scoring algorithm, and indexing the object responsive to a plurality of prefixes of the name associated with the object and the score assigned to the object.

DETAILED DESCRIPTION

System Overview

Figures 1, 2:
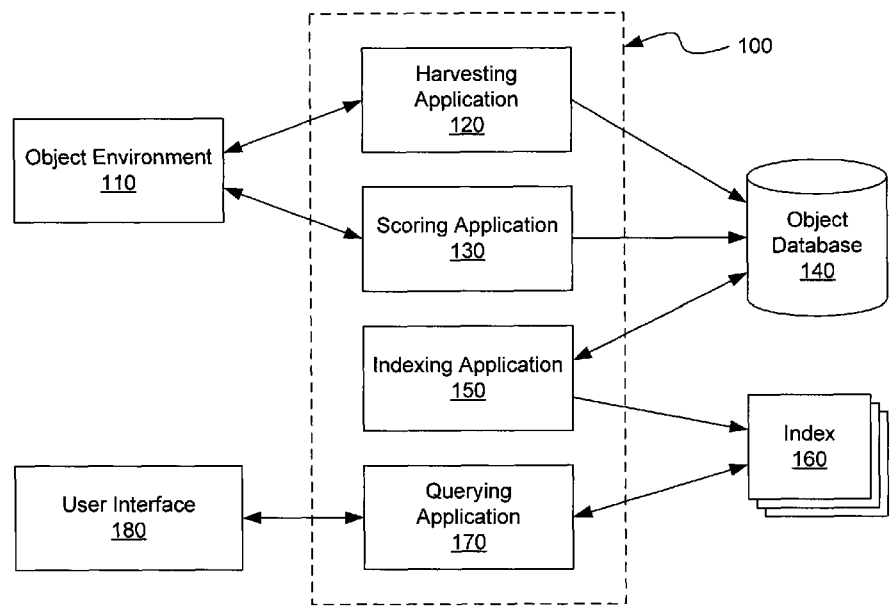
FIG. 1 is a high-level block diagram desktop search system, in accordance with embodiments of the invention.
FIG. 2 depicts a hash table for indexing objects in an object environment, in accordance with an embodiment of the invention.

FIG. 1 illustrates an embodiment of a system 100 for searching an object environment 110. The system 100 comprises a collection of objects stored for example on one or more computer hard drives, networked computer resources, or virtually (in the case of an object environment 110 created on demand). In one embodiment, the object environment 110 is a desktop environment for a personal computer, where the environment 110 includes a number of files of various types stored in a personal computer's storage and/or otherwise accessible to the personal computer. The environment 110 comprises any of a number of data objects, including, without limitation, applications, documents, utilities, media files, emails, web histories, web pages, word processing documents or other text, spreadsheets, graphics files, databases, presentations, executables, compressed documents, and/or any number of files of various types a user may want to locate or access. Objects may be introduced into and deleted from the object environment 110 on a regular basis, in association with an action by a user or some other triggering event. In an embodiment, a directory is regularly harvested from an enterprise intranet and stored in the object environment 110.

A harvesting application 120 is configured to scan the objects in the object environment and generate entries for the objects in an object database 140. The object database 140 may include the objects themselves, cached copies or encoded copies of the objects, or pointers or other references to the objects. The harvesting application 120 may comprise any of a number of well-known applications for collecting data objects from an object environment 110, such as a spider, crawler, or bot. The harvesting application 120 selectively harvests data objects according to any of a number of criteria, such as object extension and/or last modified data. Accordingly, the harvesting application 120 need not add all objects within the object environment 110 into the object database 140.

A scoring application 130 assigns a score to objects referenced or stored within the object database 140. The scoring application 130 then associates the score for each particular object with its corresponding entry in the object database 140. The scoring application 130 can access information about the objects it scores, such as the contents of the object, the type of object, when the object was last accessed or modified, and/or any other information about the object that is pertinent to its score. This metadata may be harvested by the harvesting application 120 and stored in the object database 140, or may directly be accessed by the scoring application 130 from the object environment 110. The scoring application 130 uses one or more such inputs to determine a score for each object according to any of a variety of scoring algorithms or criteria, some embodiments of which are described below. Each object's score may be stored in the object database 140 and associated with the object.

An indexing application 150 communicates with the object database 140 to obtain attribute, score, and location information about one or more objects to be indexed. Based on one or more object attribute and the object's score, the indexing application 150 indexes the object. The searchable attributes may include, without limitation, the title of the object, the file extension, a portion of the title of the object, content within the object (such as text), and/or any other attributes on which the objects can be searched. In one embodiment, the indexing application 150 places references to the objects in the indexes 160, where the references address the entries in the object database 140. The indexing application 150 indexes the objects according to an indexing algorithm, embodiments of which are described in more detail below. Each index 160 may be implemented through one or more linked lists, stacks, queues, hash tables, trees, or any other well-known data structures. In an embodiment, at least one index is implemented through an on-disk data structure that maps strings to fixed-sized arrays. This data structure may comprise a hash table, such as the hash table depicted in FIG. 2, a binary tree, or other structure. Data collisions in a hash table may be resolved using chaining, linear probing, open addressing, or any other technique.

A querying application 170 communicates with a user interface 180 to receive a search term provided by a user. In use, a user provides a relevant search term to the querying application 170, which uses the term to locate relevant objects stored in the one or more indexes 160. The search term, typically a text string, may be a full word or a partial word, such as a prefix of a desired search term. The search term may also, or alternatively, include other attributes that describe the objects, such as file type, date last modified, or multimedia attributes such as artist name. Each prefix of each of these attributes can be indexed. Responsive to receiving an appropriate search term, the querying application 170 searches one or more of the indexes 160 for the search term. In one embodiment, the set of results returned by this query are a subset of the objects that comply with the search term and have the highest associated scores. For example, if the querying application 170 is designed to return ten results, the results returned will be the ten objects that have the highest score among the objects that satisfy the search term.

The querying application 170 provides the results to the user interface 180 for display to the user. Any of a number of user interfaces 180 may be used to enter the search term and to display it to the user, including, without limitation, a web page displayed in a browser, a toolbar, a deskbar, a sidebar, or any other suitable interface. Preferably, the results are displayed to the user in order of their associated scores.

In one embodiment, the system 100 is an incremental searching system, where the system 100 queries and returns the top results to the user as the user is typing each character of a search string. In this way, the most relevant results are displayed to the user while the user is typing the search string. As the prefix of the search term gets longer, the subset of objects that satisfy the search term decreases in size. In this way, the user can cease entering the search string as soon as the desired result is found, which typically occurs before the full search term is entered.

Although the system shown in FIG. 1 includes particular functional applications and data structures, it is not necessary for every embodiment of the invention to include all of the elements depicted or for the elements to be housed in any particular configuration. The elements may be hosted in a single location, such as on a hard drive of a single computer, or the elements may be distributed across a public or private network. Various implementations may also feature the elements in different configurations. For instance, the harvesting application 120, the scoring application 130, the indexing application 150, and the querying application 170 are shown in the system as separate modules; however, these applications 120, 130, 110, and 170 may be integrated or provided as separate code executables, or their functions can be distributed across a computer network. The applications 120, 130, 110, 170 may also be implemented in software, hardware, or firmware.

Indexing and Querying

Reference will now be made to specific ways of creating and updating a table and retrieving data from the table in response to a search query in accordance with various embodiments of the invention. An exemplary table 160 is depicted in FIG. 2. The table 160 maps prefixes to fixed-size arrays 220; each array contains a set of entries, each of which contains a pointer (&1, &2, &3) to an object in a database, and the object's score (s1, s2, s 3). The entries in each array are ordered in descending order by score. Each hash value 210 is obtained by applying a hash function to a text string and is associated with an array of pointers 220 referencing objects in a database that contain that particular text string.

Figure 3:
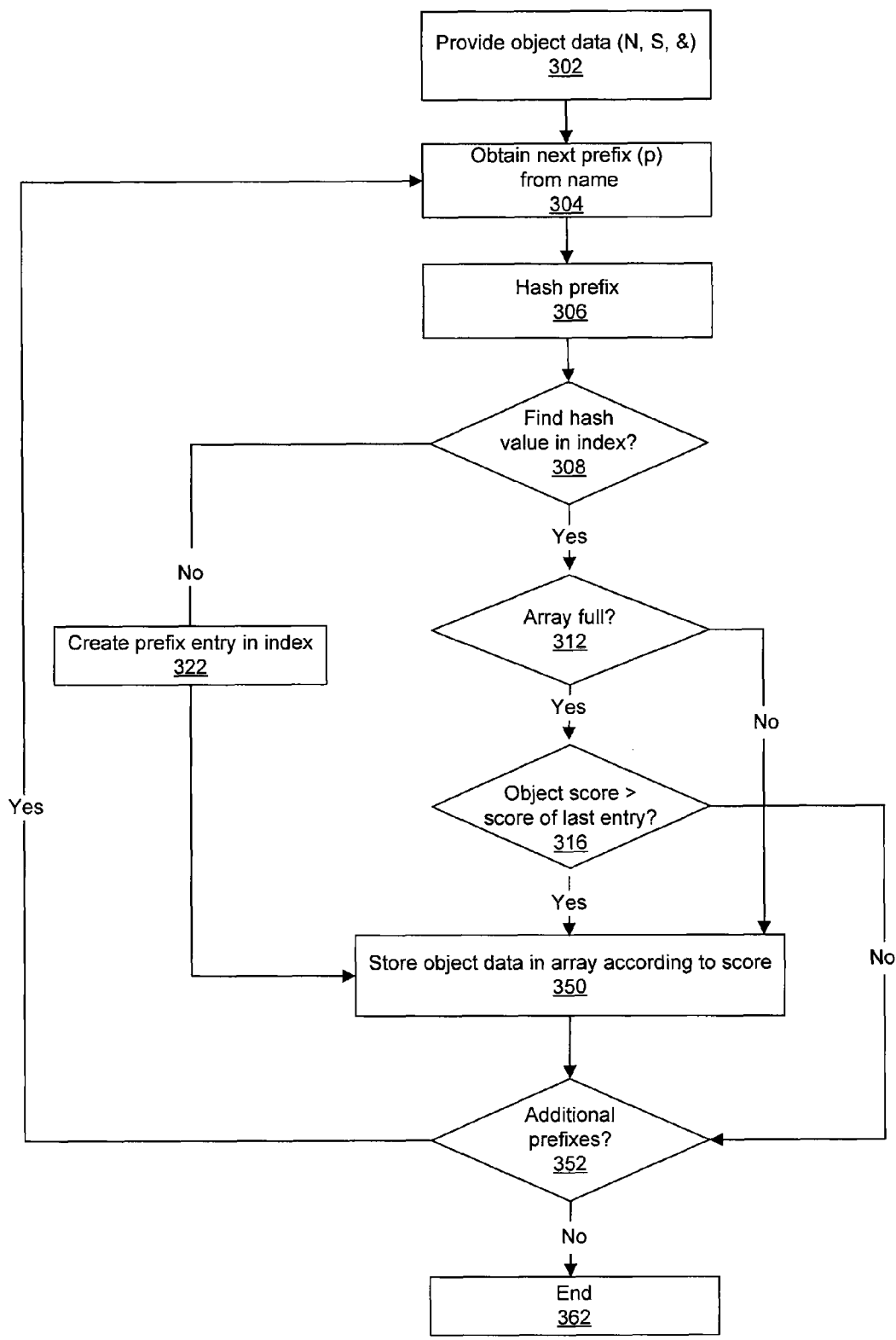
FIGS. 3 and 4 are flow diagrams of a method for indexing objects in an object environment, in accordance with embodiments of the invention.

Several methods for indexing objects according to their score and storing them in a table are described below and depicted in FIGS. 3-4. These methods are optimized to support incremental searching. Given a set of objects, each of which has a name (e.g., a string) and a score (e.g., a number), an index stores references to the objects so that for any prefix P, the K top-scored results whose names begin with P can be very quickly retrieved. The process begins when object data comprising a name N, score S, and a reference to an object & is provided to or obtained by an indexing application (step 302 of FIG. 3).

A data object may be identified by any number of names N. A single multimedia file may have multiple names N including the filename, artist name, song name, album name, actor name, and/or director name. In an embodiment, an indexing application iterates over each value of N for each discrete data object. Each prefix P, in turn, is obtained 304 from name N. For instance, as a file named "key lime pie" is indexed, a first prefix could be "k", the next prefix "ke", then "key", "key l", and so on. In an embodiment, an indexing application also indexes each object by indexing prefixes of strings extending from the beginning of each word to the end of a name N. Thus, for the name N "key lime pie", once each prefix of "key lime pie" has been indexed, all of the prefixes of "lime pie" and "pie" are also indexed.

Method 1

According to a first method, "Method 1" a given prefix P is hashed 306 into a numerical value. An indexing application searches for the hash value in the index. If 308 the hash value is not found, a new entry is created 322, and the score S, pointer &, and name N of the object are stored 350 in the array associated with the value. Since there is only one value in the array, that of the current data object, it is stored in the first position. If 308 the prefix already exists in the hash table, the indexing algorithm may take one of two possible paths. If 312 the array is not yet full, that is to say, one or more of the K entries in the array are not populated, the name N, score S, and address & of the object are stored 350 in the array in relative position vis a vis the existing entries, highest score first. However, if 312 the array associated with the prefix is already full, then an assessment is made as to whether or not the current object should displace an existing object in the array. This decision is made by comparing 316 the current object score with the lowest object score of an object stored in the array. If 316 the object to be indexed has a higher score, it pushes out the lowest scored object and is stored 350 in the array in a relative position according to its score. Once the object is saved into the array of the current prefix/hash value P, there is a check to determine if 352 there are any additional prefixes for the name N. If 352 so, the process repeats and the next prefix is obtained 304. If 316 the current object has a lower score than any other, it is not saved in the prefix array. However, even if this is the case, there is another opportunity for the object to be indexed if 352 there are any additional prefixes for the name N. If 352 so, the process continues and the next prefix is obtained 304. This process repeats until there are no additional prefixes, and then ends 362.

In an embodiment, the process described above is initiated, through the provision 302 of name N, score S, and reference & data each time new data is added to the object database, reflecting the addition of a new object or change in status of an existing object. A change in status may be treated like the creation of a new object with an updated name N, score S, and address &. Reference to the old version of the object may be either deleted or nulled in the index. In another embodiment, the reference remains but the object is deleted from the search result at run-time, through the elimination of duplicates, for instance.

Querying an Index Created with Method 1

The process of generating query results using an index created according to Method 1 is fairly simple. In an embodiment, a search term is provided through a user interface to a querying application. In the case of an incremental searching scheme, the querying application then runs queries on the search string as it is entered. For a given prefix P, the application hashes P, looks up the result, and retrieves up to K objects referenced in the array associated with the hash value. At any point, duplicates or reference to discarded objects may be eliminated as described above. In an embodiment, the querying application returns the objects in the order in which they appear in the array, given that they have already been pre-sorted by score by virtue of Method 1.

Method 2

In Method 1, because the arrays have a fixed size based on the maximum number of search results K, only results that will be retrieved are indexed. However, the algorithm requires the storage of multiple pointers to the same data object, which consumes extra read-write cycles. In addition, it may involve the creation of prefix entries that will practically never be accessed, since single search results exist for shorter prefixes of a name.

Figure 4:
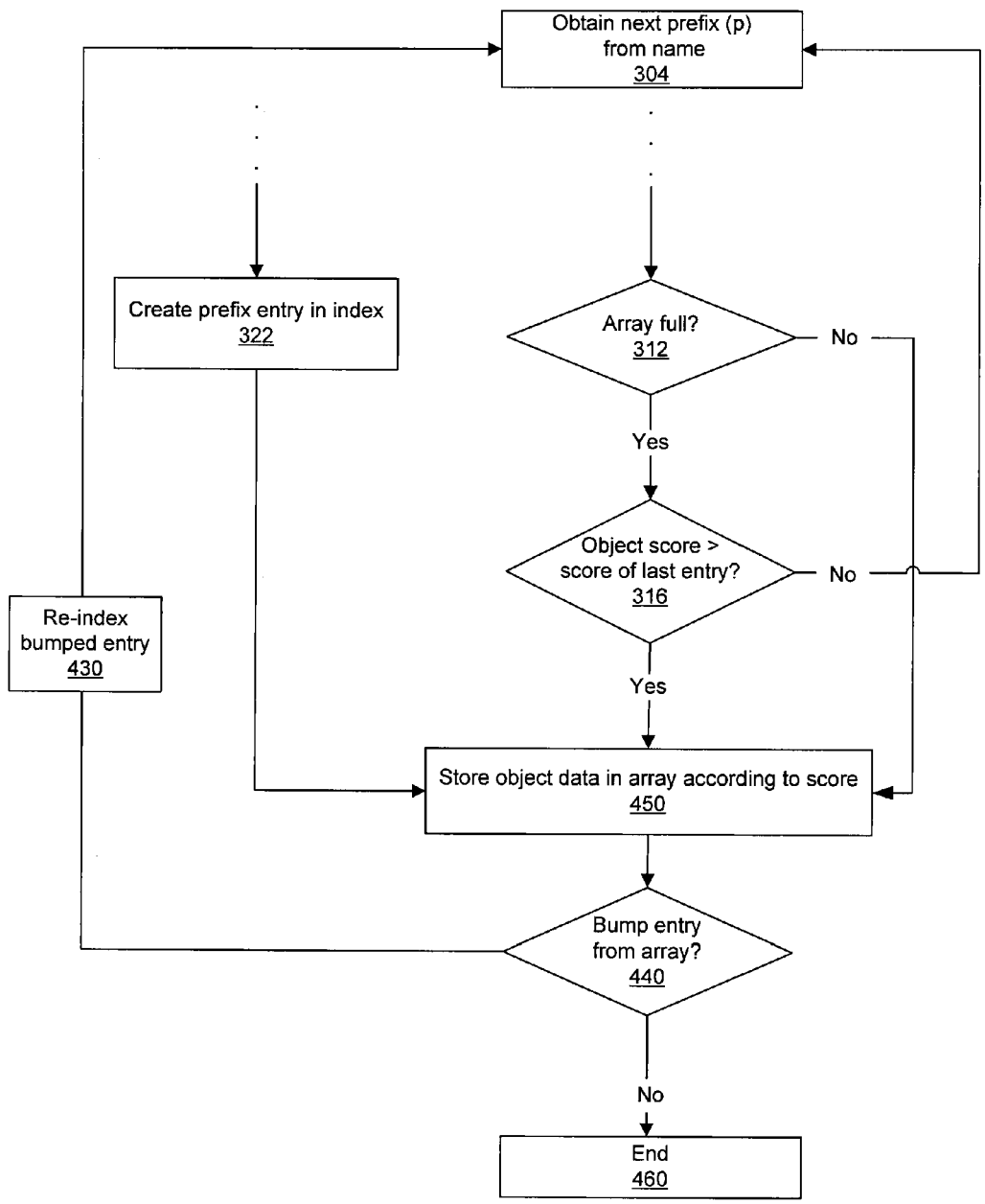

Another embodiment of an indexing algorithm is depicted in FIG. 4 that addresses some of these inefficiencies. "Method 2" shares many of the same steps as FIG. 3, but deviates at several steps including steps 430, 440, 450, and 460. As with the first method described, inputs to the process include the name N, score S, and address & of the object to be indexed. A prefix of the name is hashed and an indexing application attempts to locate the hash value in an index. If the hash value is not present, a new entry is created 322 in the index for that value. If it is present, and if 312 the prefix array is full, then there are two options. If 316 the score S of the object to be indexed is not good enough to land it a slot in the array for a given prefix P, the indexing process continues. The next prefix P is obtained 304 from the object name N, and there is an attempt to index the object according to the next prefix. If 316, on the other hand, the score of the current object is greater than the score of the last entry in the array 330, the object data is stored in the array according to its score 450. However, unlike in Method 1, there is no subsequent attempt to index the object in other parts of the data index. (In other words, step 352 and additional steps to index the object at other prefixes are skipped.) As soon as the data object is indexed in one location of the index, indexing of that object in association with the name N is complete. This saves read-write cycles during indexing, making for a more efficient background process, and also conserves memory because the resulting index is much smaller in size. However, it also means that the displaced entry needs to be reindexed. If 440 an entry is bumped from the array, which will always be the case if 316 the score of the current data object is greater than the score of the last entry in the array, the bumped entry is re-indexed 430. The process continues as successive entries are moved from location to location.

Querying an Index Created with Method 2

Figure 5:
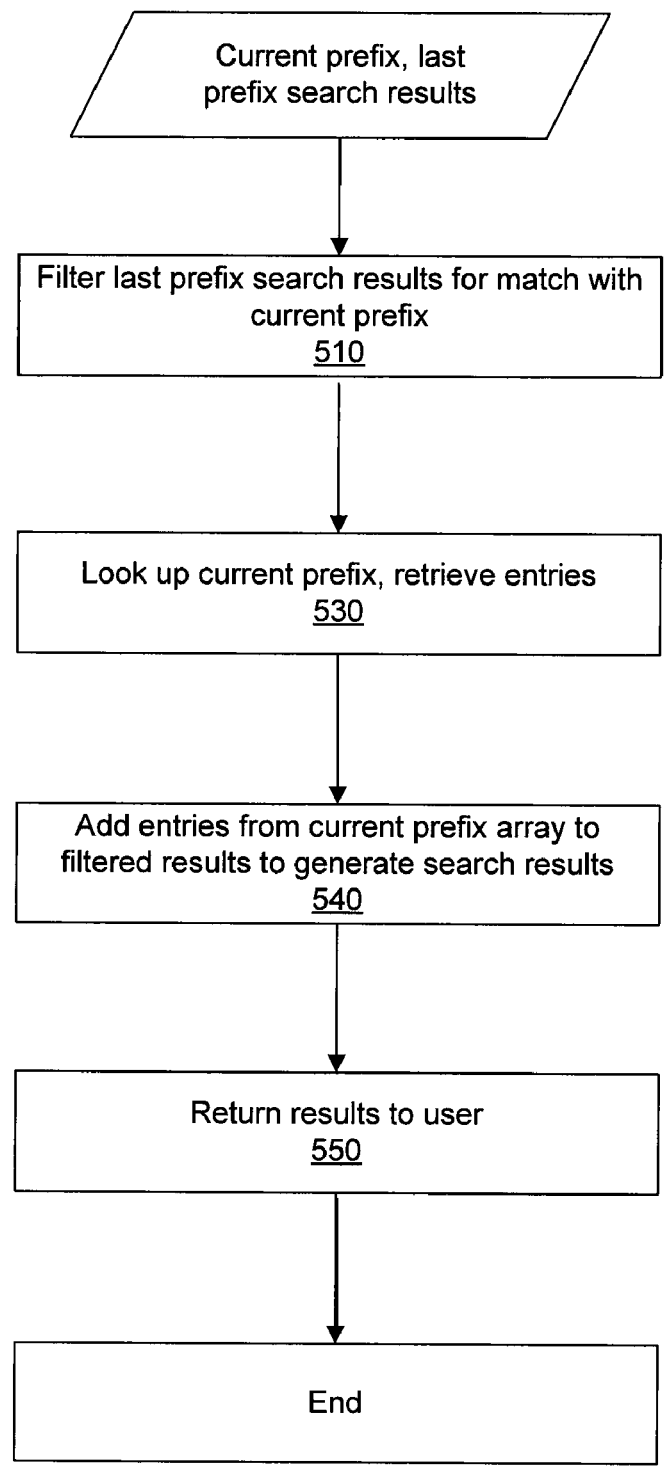
FIG. 5 is a flow diagram of a method for generating a search result in accordance with an embodiment of the invention.

As noted earlier, Method 2 improves the efficiency of indexing by writing a named object to the index a single time and maintaining an index of a minimal size. The process for generating a search result from this index differs from that previously described, but also benefits from efficiencies generated during the incremental search process. The process begins when a user begins to enter a search string. The first letter of the search string is hashed, and top K matching array values are obtained and returned. These steps mirror those previously described to generate a search result from an index indexed according to method 1. However, generating subsequent incremental search results requires a different method, and is depicted in FIG. 5. The inputs to this process are the current prefix P and search results associated with the last prefix (in the case of a prefix that is two letters long, the first letter search results). The search results comprise the array values associated with the previous searches, whether provided to the user or not. These query results are filtered 510 for a match with the current prefix. Array values associated with the current prefix are looked up 530, and the entries retrieved 530. Entries from the current prefix array are added 540 to the filtered results and the top K scored results are use to generate 540 the search result returned 550 to the user. Although this process is slightly more complicated than just looking up array entries in the hash table, as in the case of querying an index created by Method 1, because Method 2 leverages search results from previous prefixes, practically the only additional steps are to filter 510 the search results for matches with the current prefix, and merge 540 the filtered results with values from the lookup process.

Method 3

In another embodiment, a further refinement is made to accommodate situations in which the user can specify the number of search results she would like to see, some number N less than the maximum, K. With Method 2, as the user types a query string, as each prefix is processed, all K results in the prefix's array must be read even if the user has chosen to display fewer than K results. This is needed because all of the results must be filtered when the user types the next character in the query. The querying process thus is potentially inefficient, since it can require looking up each array entry in an object database to find out its full name, needed in order to filter the results as the query proceeds. With a further refinement, however, a new constant, B is introduced, wherein B<K. The user can choose to display any number of results N in between B and K, inclusive; for each query prefix, only the first N results from the prefix's array need to be read.

Unlike Method 2, under "Method 3," each object may be indexed in several different prefix arrays in the data structure. Recall that under Method 2, as soon as a prefix array is located where an object address can be stored, the indexing process for that object is complete. With Method 3, however, when indexing each term for an object, indexing does not stop until the object is indexed at some position less than or equal to B in some prefix array (where positions are numbered starting with 1). With Method 2, when an object was inserted into a full prefix array, the displaced object was re-indexed. With Method 3, when an object is inserted into a full prefix array at a position less than or equal to B in a prefix array, the object previously stored at position B in that array moves to the next position (B+1) in the array, and that attempts to re-index that object continue until it can be stored at position B or less in some longer prefix's array. (The existing object with lowest rank falls out of the array without being reindexed.) In this way, Method 3 guarantees that for each of an object's terms, the object is stored at position B or less in the prefix array for some prefix of the term.

Querying an Index Created with Method 3

The query algorithm for Method 3 is identical to that in Method 2, except that only N entries from each prefix array rather than all K entries are read and returned for the given search string. Because there's an opportunity for a named object to be indexed in multiple locations, an index created according to Method 3 will generally consume more space than one created according to Method 2. However, the process of generating search results is more efficient than with Method 2, since in Method 2 all K values of the array have to be read for each prefix.

Incremental and Multifunction Searching

As described herein, the desktop searching system can implement the indexing and querying algorithms to search for a given search query from a set of indexed objects. Configured in various ways, this functionality enables a number of different searching techniques, and some of the embodiments disclosed herein are particularly well suited for incremental searching. In incremental searching, as a user begins to input a search query, such as a text string, the system provides the user with intermediate results based on the partially inputted query. Each time the user inputs another character in the search query, the system performs a new query to return a new set of results that match the current search string. In one embodiment, therefore, the desktop searching system provides an incremental searching feature that displays search results as the user inputs a search query.

Figure 6:
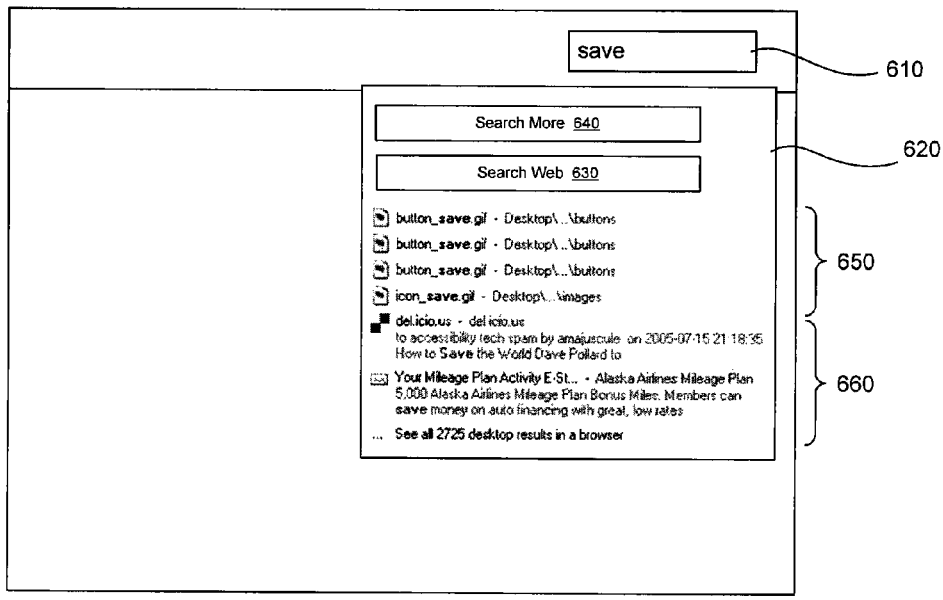
FIG. 6 illustrates a user interface for an incremental searching system, in accordance with an embodiment of the invention.

FIG. 6 illustrates a user interface for an incremental searching system, in accordance with an embodiment of the invention. The user interface includes a search box 610, which accepts a query from a user. In the embodiment shown, the search box 610 is fixed to a taskbar in the operating system (such as in one of Microsoft's WINDOWS® operating systems), and in this context the search box 610 may be called a "deskbar." Alternatively, the search box 610 may be located in of any of a number of user interfaces, such as in a web site displayed in a window of a web browser, in a toolbar for an executable, in a floating deskbar (e.g., detached from the taskbar), in a utility (such as in a sidebar application), or in any other useful format for receiving search terms.

As a user enters a search term into the search box 610, the system queries the search database to find objects in the database that match the currently entered search term. The results from the search are then displayed in a window 620, in which the number of results displayed may be limited. The maximum number of results that can be shown in the window 620 can be set according to user preferences. Where more results match the search term than can be displayed, the results to be displayed may be selected and sorted based on a scoring criteria, described in more detail below. In one embodiment, the search results are ordered so that the most relevant items returned are placed the most proximate to the search box 610. For example, where the search box 610 is a deskbar on the bottom of the screen, the search results are placed in the window 620 from bottom to top in order of decreasing relevance. This makes it easier for a user to access the most relevant items, since the focus on the screen is on the search box 610.

In one embodiment, a new query is performed each time a user enters a character in the search box 610, thereby implementing a character-by-character incremental search. As the user types an additional character into the search box, the set of results returned from the query is refined to match the new, narrower search term. Often, the results will be sufficiently narrowed so that the desired object is located before the user finishes typing the entire search term. In this way, the user is saved the effort of having to type the entire term, able instead to locate an object by typing a prefix of the object's title.

In other embodiments, the window 620 includes one or more fast search options, which allow a user to perform different kinds of searches quickly and easily from this interface. As illustrated, one fast search option is a "Search Web" option 630 item, which allows the user to perform a web search for the query currently in the search box 610. Another fast search option shown is a "Search More" option 640, which opens a list of specific searches from which a user can select. These specific searches may include searches in various domains, such as news, groups, desktop, local content, images, or other media. In this way, the search box 610 can combine any of a number of useful types of searches that a user may perform into a single interface.

Further combining functionality into the searching interface, embodiments of the invention also allow for directly navigating to a web site by entering its associated URL into the search box 610. In one embodiment, the system can predict that the user wants to open a web site instead of search for a search string based on the syntax of the entered text. For example, the system may be configured so that typing double slashes indicates a web site; hence, typing "mydomain.com" into the search box 610 causes a browser on the computer system to navigate directly to that site. Similarly, in another embodiment, a user can directly access a file or application on the local computer system by typing the file's path into the search box 610, which causes the computer system to open the file or application associated with that path.

Temporal Ranking Scheme

In embodiments of the searching systems described herein, such as a desktop search system, the search results provided to the user are selected and ordered according to their relevance. It can be appreciated that there are an unlimited number of ways in which the relevance of the search results can be determined. A particularly useful relevance criteria for desktop searching systems is based on how likely each item is to be accessed in the future, since an item that is more likely to be used in the future is more likely to be the item the user is looking for in the search. Accordingly, the relevance of each particular search result may be determined according to an estimation of the frequency that the corresponding item will be used in the future. In one embodiment, the frequency of use in the past or how recently the item was last used can be a good proxy for this estimation. Other factors may also be considered in this determination of relevance.

Figure 7:
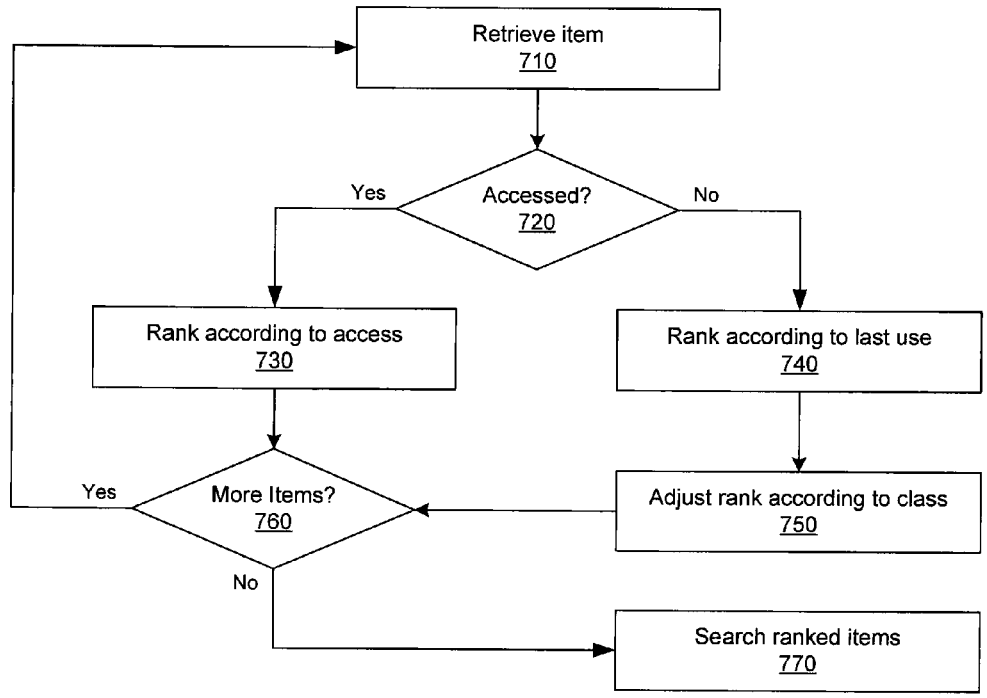
FIG. 7 is a flow diagram of a method for ranking the results of a search, in accordance with an embodiment of the invention.

FIG. 7 illustrates one embodiment of a temporal ranking scheme for ranking items based on how likely they are to be accessed in the future, and thereby how likely they are to be the item for which the user is currently searching. In one embodiment, the ranking scheme is used for a desktop search. The ranking scheme may be employed to rank items as they are being indexed for a desktop search, or it may be used to rank items that are returned as results from a query. Items returned from a search query are typically ordered for display to a user according to their rankings. In one embodiment, the ranking scheme generates a numerical score for each item, which can be compared with the numerical scores for the other items. Accordingly, a first item to be ranked is retrieved 710, and the process is generally repeated for all of the items to be ranked.

If 720 the retrieved item has been previously launched using the desktop search, the system ranks 730 the item according to its last access date using the search system. A more recent access date may indicate a more frequent use of the item, so the rank is higher for a more recent access. If 720 the retrieved item has not been previously launched using the desktop search, the system ranks 740 the item according to a last use date. A more recent use date may indicate a more frequent use of the item, so the rank is higher for a more recent use. What the last use date is may depend on the type of item. For example, the last use date for a document may be its last-modified or last-opened date, for an application may be its last-launched date, and for a web page may be its last-visited date, and for an email may be its last-opened or received date.

The items that have been previously launched using the desktop search are more relevant than items that have not been previously launched using the desktop search. This is because a user is likely to use the desktop search consistently to launch the same kinds of items. Accordingly, once an item that has not been previously launched using the search is ranked 740, the item's ranking is adjusted 750 downward to account for its lesser relevance based on a class associated with the item. In one embodiment, the class of the item is determined by an attribute that indicates a frequency or likelihood of use of the item. In one embodiment, the class is determined by a location of the item. Taking one of Microsoft's WINDOWS' operating systems, for example, items located in My Documents, Start Menu, or Control Panel are penalized very little, since they are presumably more relevant, whereas arbitrary files on the hard disk are penalized more since there is less reason to believe they are often accessed and thus relevant to the search. In other embodiments, the class may be determined by the item's type. For example, documents, applications, web pages, and emails are more relevant because they are accessed more often. They would therefore be penalized less than system files and hidden files, which as rarely accessed by a user and are thus not very relevant. Other attributes, such as file size, may also be used to define the class.

If 760 there are more items to rank, another item is retrieved 710 and the process repeats until all of the items have been ranked. The resulting ranking for each item leads to a relevance score that indicates how likely it is that the user was looking for that particular object, under the theory that a user is likely to be looking for objects the user has used more often in the past. Accordingly, if 760 there are no more items to rank, a relative ordering of the items according to their relevance for the search is possible. With the items ranked, the system can be used to search 770 based on a query for matching items, and the matching items displayed by rank (i.e., according to their likely relevance to the user). If the number of items exceeds a predetermined maximum, the system may display only the top-ranked items. In such a case, the system may allow the user to bring up the full search results in another window, such as in a browser.

The actual numerical values used to rank items and the penalties are selected based on the desired characteristics of the ranking scheme. The penalties can be adjusted to give more relevance to items in certain classes, and an item may belong to more than one class so that multiple penalties or even bonuses can be used to adjust the item's rank. Accordingly, these and other adjustments and variations that can be made to the ranking scheme are possible within the scope of embodiments of the invention.

Combined Title Prefix and Full-Word Content Search

In one embodiment, a searching system, such as the system 100 described in FIG. 1, implements a combined title prefix and full-word word search. Such a combined search involves searching both the titles and the content of a set of items. Given a text string query, the system matches prefixes or full words in the documents' titles, but matches only full words in the documents' contents. This combined search may be useful in several contexts, such as a desktop search, as it allows a user to locate items according to their title as well as their contents. This combined search may be particularly useful for incremental searching systems, which accept as inputs either prefixes or full words. Matching the prefix of titles using a search term is often useful, but matching the prefixes of the content of items would typically return too many results to be useful. Accordingly, the combined search allows the benefits of a title prefix search with the ability to search content in a set of items.

In one embodiment, the system 100 creates two indexes 160*a* and 160*b*. A first index 160*a* indexes the prefixes of the titles associated with the set of items to be searched, and a second index 160*b* indexes the textual content of the set of items to be searched. In one embodiment, the first index 160*a* comprises a hash table whose entries represent prefixes for titles of the data objects in the object environment 110, such as that illustrated in FIG. 2 and discussed in the corresponding description. The second index 160b may comprise any of a number of well-known data structures for indexing textual content of documents, such as a hash table whose entries represent full-word terms that can be found in the contents of the data objects in the object environment 110.

When a user enters a search term, the search term is queried on the prefix index 160a as a prefix, and the search term is also queried on the content index 160b as a full-word term. The results are then merged and returned to the user, or the results may be provided separately to the user. The user interface shown in FIG. 6 includes a results window 620 having a portion 650 for showing the results of the title prefix search and a portion 660 showing the results of the full-word content search. The results may be ranked according to any desired criteria, such as the temporal ranking scheme described herein. The results shown in portions 650 and 660 may also be separately ranked and a predetermined number of results of each type displayed, or they may be ranked together.

In the example shown in FIG. 6, the search term "save" is used. The full-word results returned may include documents on the user's hard drive, web pages the user has visited, and emails whose content contains the full search term. In the example, there are two full-word results in which the word "save" appears: a web page and an email. Among the title results returned are documents and web pages whose title contains the search term in whole or in part. The title results are special because the search term need not be complete; it can just contain a portion of the title, such as the prefix.

SUMMARY

In one embodiment, a software module is implemented with a computer program product comprising a computer-readable medium containing computer program code, which can be executed by a computer processor for performing any or all of the steps, operations, or processes described herein. Accordingly, any of the steps, operations, or processes described herein can be performed or implemented with one or more software modules or hardware modules, alone or in combination with other devices. Moreover, any portions of the system described in terms of hardware elements may be implemented in software, and any portions of the system described in terms of software elements may be implemented in hardware, such as hard-coded into a dedicated circuit. For example, code for performing the methods described can be embedded in a hardware device, for example in an ASIC or other custom circuitry. This allows the benefits of the invention to be combined with the capabilities of many different devices.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above teachings. It is therefore intended that the scope of the invention be limited not by this detailed description, but rather by the claims appended hereto.

What is claimed is:

1. A computer-implemented method of indexing a collection of objects, each object having one or more object names that each having one or more name prefixes, each object having an associated score, and each object further having an address, the method comprising:
   maintaining a plurality of prefix indices, each distinct prefix index corresponding to a distinct name prefix, all distinct name prefixes that exist for the object names in the collection having a corresponding prefix index, each prefix index being limited to indexing no more than K objects, wherein K is a predetermined constant; and
   indexing in each prefix index no more than K objects, each object having an object name with a name prefix that is the same as a name prefix corresponding to the prefix index, wherein each index entry identifying an object includes the score of the object and the address of the object, and wherein each object in each prefix index is one of K top-scoring objects having a name prefix corresponding to the prefix index.

2. The method of claim 1, wherein each object in the collection of objects appears in only one of the prefix indices.

3. The method of claim 1, wherein each object in the collection of objects appears in each prefix index for which the object is one of K top-scoring objects having a name prefix corresponding to the prefix index.

4. The method of claim 1, wherein the score of each object is based on at least one of contents of the object, a type of the object, a last access time associated with the object, or a last modified time associated with the object.

5. The method of claim 1, wherein one or more objects in the collection are not indexed in the plurality of the prefix indices.

6. The method of claim 1, further comprising:
   storing each prefix index as a vector in an index array; and
   associating each prefix index with the corresponding name prefix through a hash value generated by hashing the name prefix.

7. The method of claim 6, further comprising:
   identifying each prefix index in the index array based on the hash value.

8. The method of claim 1, wherein one or more objects in the collection having a respective object name with a name prefix corresponding to a first prefix index are not indexed in the first prefix index.

9. A computer storage medium encoded with a computer program, the program comprising instructions that when executed by data processing apparatus cause the data processing apparatus to perform operations comprising:
   maintaining a plurality of prefix indices, each distinct prefix index corresponding to a distinct name prefix, all distinct name prefixes that exist for the object names in the collection having a corresponding prefix index, each prefix index being limited to indexing no more than K objects, wherein K is predetermined constant; and
   indexing in each prefix index no more than K objects, each object having an object name with a name prefix that is the same as a name prefix corresponding to the prefix index, wherein each index entry identifying an object includes the score of the object and the address of the object, and wherein each object in each prefix index is one of K top-scoring objects having a name prefix corresponding to the prefix index.

10. The computer storage medium of claim 9, wherein each object in the collection of objects appears in only one of the prefix indices.

11. The computer storage medium of claim 9, wherein each object in the collection of objects appears in each prefix index for which the object is one of K top-scoring objects having a name prefix corresponding to the prefix index.

12. The computer storage medium of claim 9, wherein the score of each object is based on at least one of contents of the object, a type of the object, a last access time associated with the object, or a last modified time associated with the object.

13. The computer storage medium of claim 9, wherein one or more objects in the collection are not indexed in the plurality of the prefix indices.

14. The computer storage medium of claim 9, wherein the operations further comprise:
storing each prefix index as a vector in an index array; and
associating each prefix index with the corresponding name prefix through a hash value generated by hashing the name prefix.

15. The computer storage medium of claim 14, wherein the operations further comprise:
identifying each prefix index in the index array based on the hash value.

16. The computer storage medium of claim 9, wherein one or more objects in the collection having a respective object name with a name prefix corresponding to a first prefix index are not indexed in the first prefix index.

17. A system comprising:
one or more computers; and
a computer-readable storage medium coupled to the one or more computers having instructions stored thereon which, when executed by the one or more computers, cause the one or more computers to perform operations comprising:
maintaining a plurality of prefix indices, each distinct prefix index corresponding to a distinct name prefix, all distinct name prefixes that exist for the object names in the collection having a corresponding prefix index, each prefix index being limited to indexing no more than K objects, wherein K is a predetermined constant; and
indexing in each prefix index no more than K objects, each object having an object name with a name prefix that is the same as a name prefix corresponding to the prefix index, wherein each index entry identifying an object includes the score of the object and the address of the object, and wherein each object in each prefix index is one of K top-scoring objects having a name prefix corresponding to the prefix index.

18. The system of 17, wherein each object in the collection of objects appears in only one of the prefix indices.

19. The system of claim 17, wherein each object in the collection of objects appears in each prefix index for which the object is one of K top-scoring objects having a name prefix corresponding to the prefix index.

20. The system of claim 17, wherein the score of each object is based on at least one of contents of the object, a type of the object, a last access time associated with the object, or a last modified time associated with the object.

21. The system of claim 17, wherein one or more objects in the collection are not indexed in the plurality of the prefix indices.

22. The system of claim 17, wherein the operations further comprise:
storing each prefix index as a vector in an index array; and
associating each prefix index with the corresponding name prefix through a hash value generated by hashing the name prefix.

23. The system of claim 17, wherein one or more objects in the collection having a respective object name with a name prefix corresponding to a first prefix index are not indexed in the first prefix index.

* * * * *

UNITED STATES PATENT AND TRADEMARK OFFICE
CERTIFICATE OF CORRECTION

PATENT NO.        : 8,224,870 B1
APPLICATION NO.   : 12/360017
DATED             : July 17, 2012
INVENTOR(S)       : Adam Dingle Page 1 of 1

It is certified that error appears in the above-identified patent and that said Letters Patent is hereby corrected as shown below:

Column 14, Line 9 at Claim 18; replace:
        "18. The system of 17 wherein each object in the collection" with
        -- 18. The system of claim 17 wherein each object in the collection --

Signed and Sealed this
Fourth Day of September, 2012

David J. Kappos
*Director of the United States Patent and Trademark Office*